Figure 1:
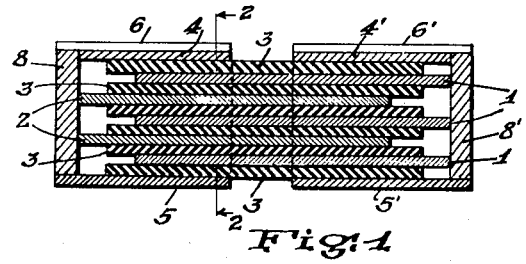

Jan. 28, 1941.　　　A. C. DUCATI　　　2,229,694

ELECTRICAL CAPACITOR

Filed Oct. 29, 1937

INVENTOR.
Adriano Cavallieri Ducati
BY
ATTORNEY.

Patented Jan. 28, 1941

2,229,694

UNITED STATES PATENT OFFICE 2,229,694

ELECTRICAL CAPACITOR

Adriano Cavalieri Ducati, Bologna, Italy, assignor to Radio Patents Corporation, New York, N. Y., a corporation of New York Application October 29, 1937, Serial No. 171,608
In Italy October 31, 1936

1 Claim. (Cl. 175—41)

This invention relates to electrical capacitors, more particularly to capacitors which are adapted to carry substantial current values as required in high frequency transmitting and other electrical circuits.

According to the present practice of constructing such capacitors it is customary to assemble a number of alternate dielectric and conductive elements into a stack or other body held together by a clamp to form a compact block and to ensure constant capacity and prevent relative mechanical movements of the elements during the handling and operation of the capacitor. A stack or unit built up in this manner may be connected with other units either in series or parallel or in mixed arrangement in such a manner as to obtain a resultant capacity and operating voltage which the capacitor can safely withstand in service.

In the construction of capacitors of the aforementioned general character, one of the major considerations to be given is the provision of means for reducing and/or efficiently carrying off the heat generated within the capacitor body by ohmic, dielectric and eddy current losses or due to other causes well known. The smaller the amount of heat produced per unit of space occupied by the capacitor body and the better the conduction of the heat generated within the capacitor to the outer surface and its radiation therefrom into or absorption by the surrounding medium, the smaller will be the amount of space and bulk required for a capacitor having a desired electrical capacity and being capable of safely withstanding a desired operating voltage. Such reduction of size and bulk of the capacitor will in turn result in reduced costs, better adaptability of the capacitor to varying operating conditions and other well known desirable characteristics.

Accordingly, an object of the present invention is the provision of an electrical capacitor which is of rugged and compact construction and which enables a rapid and efficient dissipation of the heat generated within the capacitor body.

Another object of the invention is to provide a simple and compact capacitor unit adapted for efficiently dissipating the heat generated therein during its operation and which may be conveniently electrically and mechanically assembled with similar units to secure a desired resultant capacity and operating voltage at which the capacitor is to be used in service.

In capacitor assemblies of the type heretofore known in the art, a substantial amount of heat is generated in the conducting leads connecting one unit with the next unit due to the ohmic resistance presented to the current flowing between the units.

Accordingly, a further object of the invention is the provision of a capacitor unit of simple and compact construction and adapted to be connected with units of similar design and construction in a most simple and convenient manner such as by soldering, welding or otherwise directly connecting the units together to form a self-supporting rigid structure substantially without requiring any separate electrical and mechanical connecting and/or supporting elements.

Another object is the provision of a capacitor which is most simple in construction and easy to assemble as well as highly efficient and reliable in operation compared with capacitors of similar type heretofore known in the art.

Figure 3:
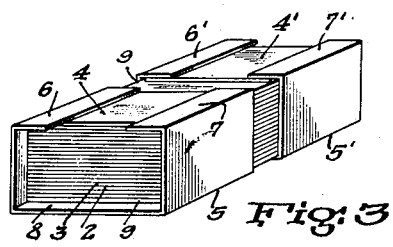
Figure 4:
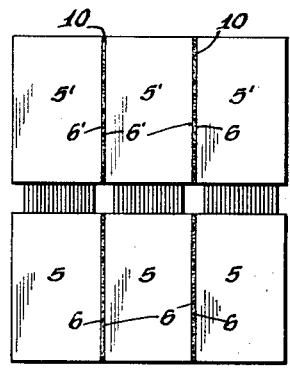
Figure 5:
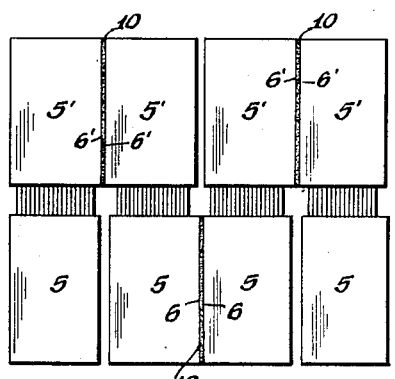
Figure 6:
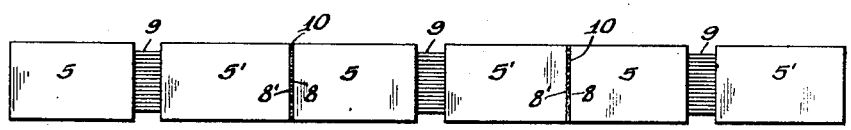
Figure 7:
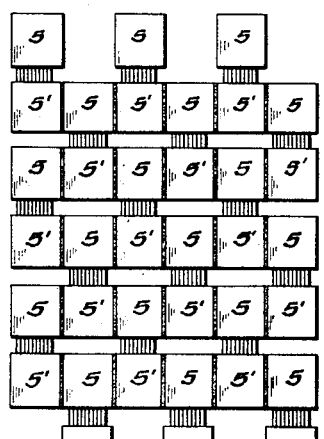
Figure 2:
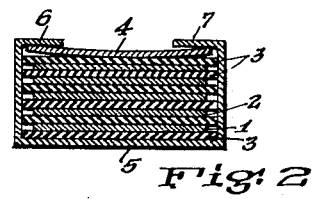
Figure 8:
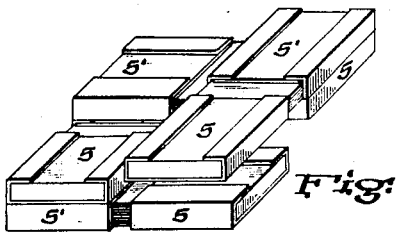

The above and further objects and advantages of the invention will become more apparent from the following detailed description taken with reference to the accompanying drawing forming part of this specification, and wherein Figure 1 is a longitudinal cross-sectional view of a capacitor of the sheet-stack type constructed in accordance with the invention with the thickness of the elements shown greatly exaggerated for the sake of clearness of illustration; Figure 2 is a cross-sectional view taken on line 2—2 of Figure 1; Figure 3 is an isometric view of a capacitor of the type shown in Figures 1 and 2; Figure 4 shows an assembly of a plurality of capacitor units connected in parallel in accordance with the invention; Figure 5 illustrates an assembly of capacitor units according to the invention connected in series; Figure 6 shows a modification of units connected in series; Figure 7 shows a plurality of capacitor units connected both in parallel and in series; Figure 8 illustrates another modification of a plurality of units mounted and connected in series.

Similar reference numerals are employed to denote similar elements throughout the different views of the drawing.

Referring more particularly to Figures 1 to 3, there is shown a capacitor of the sheet-stack type constructed according to the invention, comprising a plurality of conducting elements or electrodes such as sheets of metal foil 1 and 2 interleaved with dielectric elements such as sheets of mica 3 to form a condenser stack or body with the conducting elements 1 of one polarity projecting at one side of the stack and alternating with the conducting elements 2 of opposite polarity projecting at the other side of the stack in accordance with well known practice.

The electrodes and dielectric elements thus assembled form a block which is tightly pressed to constitute a unit of utmost compactness. There are further shown a pair of pressure plates 4 and 4' placed upon the upper face of the stack and preferably having an inwardly curved shape and consisting of springy metal in order to apply efficient pressure when clamped down upon the stack in the manner described hereafter and as seen more clearly from Figure 2. The plates are arranged in spaced relation from each other so as to leave a free insulating space or saddle therebetween as shown at 9. Items 5 and 5' are a pair of metal terminal-clamps, consisting in the example shown of U-shaped sheet metal members bent around the opposite ends of the capacitor stack and pressed into firm engagement with the latter and the pressure plates 4 and 4', respectively, by turning inwardly the edge portions 6 and 7 and 6' and 7', respectively, of the clamp members and by pressing same into tight engagement with the capacitor stack. After the clamps 5 and 5' have been applied in this manner by the aid of a suitable pressing device, they may be further fixed in position by firmly connecting the edge portion 6, 7 and 6', 7' with the pressure plates 4 and 4', respectively, such as by applying solder along the edges of the clamps firmly uniting them with the pressure plates. In this manner the clamp members are prevented from slipping off the pressure plates during assembly and handling.

The terminal-clamps 5 and 5' in the example shown project beyond the edges of the capacitor body or stack thereby forming a pair of compartments 8 and 8' which are filled with a suitable conducting material applied in liquid state and becoming solid at normal temperature such as solder or an equivalent substance. In this manner conducting terminal surfaces are formed within the compartments 8 and 8' and the unit is further welded into a solid and compact mass, while at the same time effecting efficient electrical terminal connection between the protruding edges of the electrodes of like polarity and the adjacent clamp members also serving as electric terminals for the capacitor.

In Figure 1 of the drawing, the thickness of the elements has been greatly exaggerated for clearness of illustration. In actual practice where thin metal foils and mica sheets or the like are used, the protruding edges of the electrodes 1 and 2 are in close proximity and contact thereby preventing the solder or other conducting material filling the compartment 8 from entering through the spaces between the protruding edges into the interior of the capacitor body and causing a short circuit with the electrodes of opposite polarity. In order to effect a good mechanical and electrical connection, the electrodes may for instance consist of copper and the terminal-clamps of brass or phosphor bronze in which case an intimate mechanical and electrical connection by means of a solder filling as described may be ensured.

As is seen in capacitors constructed in the manner described and disclosed, there is a direct connection from the active foil or electrode portions to a large size terminal without any intermediary conducting path for the electric current, resulting in a substantial reduction or complete suppression of losses due to high frequency resistance offered to the current in flowing from the active electrode portion to the terminal of the capacitor as is the case to a more or less extent in capacitor constructions heretofore known in the art. As is well known, the path of a high frequency current is exclusively along the surface of the conductor which accounts for the further advantage of the inventive structure which permits of the provision of a clamp of nearly half the size of the entire capacitor unit. This feature presents the further advantage desirable in many cases that the clamps applied in the manner described afford a complete shielding of the interior of the capacitor body.

Another loss which is substantially reduced in a structure according to the invention is due to heat dissipation difficulties. As is well known, if a capacitor is under load the electrodes become heated and such heating may become notably harmful with regard to operating stability and insulation characteristics of the capacitor. One of the main considerations, therefore, to be given in the construction of such capacitors is to permit the heat generated within the capacitor to be easily conducted to the outside surface of the capacitor for radiation into or absorption by the surrounding medium. In this respect, the construction in accordance with the present invention constitutes a marked improvement by reason of the fact that the heat produced within the capacitor is directly conducted to the large size clamp due to the direct connection of the metallic elements or electrodes to the clamp-terminals, and dissipated therefrom immediately and efficiently due to the large radiating surfaces of the latter.

As will be apparent from the above, the invention is not limited to the specific type of condenser shown and described for the purposes of illustration, but may be equally employed in the construction of condensers of different type without departing from the spirit and underlying concept thereof. Thus, instead of a sheet-stack type condenser, as shown, the condenser body may consist of a rolled condenser unit obtained by winding a pair of strips of metal foil interleaved with strips of paper or other dielectric material into a roll with the longitudinal edges of the metal foil strips protruding at opposite ends of the roll similar as the conductive sheets or plates in a stacked condenser. The roll may be pressed into a flat shape in a known manner and the unit provided with clamps and electric terminal members in substantially the same manner as a stacked capacitor unit described hereinabove.

The capacitor unit according to the present invention as described hereinbefore is preferably of a small size and capacity, while the desired capacity values and operating voltages may be obtained by electrically and mechanically connecting a plurality of units in a most simple and easy manner without requiring additional mounting and electric connecting elements, such as by soldering, welding or otherwise joining the units to form a rigid self-supporting structure in such a manner that the assembled units form their own mounting rack or support. In addition, the connection of the individual capacitor units may be such as to allow a cooling medium to have free and ready access to substantially all the units thereby preventing excess heating and enabling a capacitor assembly of this type to be used for greater loads and at higher operating voltages compared with similar arrangements known in the prior art. The individual units may be connected in parallel or series or grouped in mixed connection to suit any existing conditions of load and insulation requirements as will be apparent from the exemplifications shown by the remaining figures of the drawing.

In the formation of such groups, while the advantages of each capacitor unit as set forth taken individually are retained a further reduction of losses beyond the sum total of the losses of the individual units is obtained due to the increased heat radiating capacity of the assembled unit or structure on account of the direct joining or metallic connection of the large size terminals of the several units thereby further increasing the heat radiating surface of an individual capacitor unit embodied in the structure.

Referring to Figure 4, there is shown a structure comprising three capacitor units having corresponding clamp-terminal members directly electrically and mechanically connected such as by soldering, welding or any other suitable connection. In the example shown, the corresponding clamp terminals 5 and 5' of the units are connected together as shown at 10 preferably by soldering the bent over edge portions 6 and 7 and 6' and 7' directly onto the corresponding edge portions of the adjacent capacitor unit. In this manner, all the capacitor units are connected in parallel and form a compact and rigid structure without requiring any further mounting or supporting members and electric connectors.

In Figure 5 there is shown a similar capacitor structure in which the units are connected in series instead of in parallel as shown in Figure 4. For the latter purpose the terminal or clamp of one polarity of the first unit is soldered onto the clamp or terminal of opposite polarity of the second unit and the following units connected successively, in an analogous manner whereby all the units are connected in series as is readily understood from the illustration.

Referring to Figure 6, there is shown an alternative method of connecting a plurality of units in series by directly joining the terminal surfaces connecting the protruding electrode portions of like polarity and formed by a solder filling or the like as described hereinbefore to the terminal surface of the adjacent unit as seen from the drawing.

Figure 7 illustrates a further modification comprising a plurality of capacitor units divided into groups—each group comprising six units in the example illustrated—with the units of each group connected in series in the manner shown in Figures 5 and all the groups—three groups being shown in the example illustrated—joined by soldering and connected in parallel similar according to Figure 4.

Referring to Figure 8 there is illustrated an alternative method of connecting a plurality of capacitor units in series which has the advantage of affording ready and free access of a cooling medium to all the units resulting in increased heat dissipating facilities and other improved operating characteristics of the capacitor assembly. According to this modification, the units are joined at their flat surfaces, each successive unit being at right angle to the preceding unit as shown in the drawing to form a rectangular spiral with sufficient free space between the individual units through which a suitable cooling medium such as air, oil or the like may circulate for rapid and efficient dissipation of the heat generated within the capacitor units.

It will be apparent from the above that the invention is not limited to the specific constructions and methods shown and disclosed herein for illustration, but that numerous modifications and variations may be resorted to differing from the specific exemplifications disclosed and described without departing from the underlying inventive thought and coming within the scope of the invention as defined in the appended claim.

I claim:

An electrical capacitor comprising a stack of metallic elements interleaved with and covered on its opposite faces by dielectric elements, the metallic elements of opposite polarity projecting beyond said dielectric elements at opposite front sides of the stack, a pair of flat metallic clamping elements substantially embracing portions of said stack adjacent said front sides and spaced from each other to an extent only to afford sufficient insulation therebetween, said clamping elements contacting one of said outside dielectric members, a springy element arranged between the other outside dielectric element and each clamping element to exert pressure upon the respective portion of said stack, each of said clamping elements projecting beyond said front sides of the stack to form a rim, and a conductive body filling and thereby sealing the space inside each of said rims and united with the latter and the projecting ends of said metallic elements of like polarity, whereby said clamping elements and conductive bodies united thereto are rigidly connected with said stack and form the terminals of the capacitor.

ADRIANO CAVALIERI DUCATI.